United States Patent
Nossam

(10) Patent No.: US 10,445,696 B2
(45) Date of Patent: Oct. 15, 2019

(54) METHODS AND SYSTEMS FOR ORCHESTRATION OF SUPPLY CHAIN PROCESSES USING INTERNET OF TECHNOLOGY SENSOR'S EVENTS

(71) Applicant: Wipro Limited, Bangalore (IN)

(72) Inventor: Deleep Kumar Nossam, Sunnyvale, CA (US)

(73) Assignee: Wipro Limited, Bangalore (IN)

( * ) Notice: Subject to any disclaimer, the term of this patent is extended or adjusted under 35 U.S.C. 154(b) by 305 days.

(21) Appl. No.: 15/396,857

(22) Filed: Jan. 3, 2017

(65) Prior Publication Data
US 2018/0189731 A1    Jul. 5, 2018

(51) Int. Cl.
*G06Q 10/08* (2012.01)

(52) U.S. Cl.
CPC ....... *G06Q 10/0875* (2013.01); *G06Q 10/083* (2013.01)

(58) Field of Classification Search
USPC ......................................................... 705/29
See application file for complete search history.

(56) References Cited

U.S. PATENT DOCUMENTS

| | | | |
|---|---|---|---|
| 7,822,682 B2 | 10/2010 | Arnold et al. | |
| 9,563,896 B1 * | 2/2017 | Bender | G06Q 30/018 |
| 9,674,124 B1 * | 6/2017 | Fisher | H04L 51/066 |
| 10,033,764 B1 * | 7/2018 | Nachenberg | H04L 63/20 |
| 2003/0233290 A1 | 12/2003 | Yang et al. | |
| 2005/0052284 A1 * | 3/2005 | Schmidtberg | G06Q 10/06 340/588 |
| 2011/0137800 A1 * | 6/2011 | Kerschbaum | G06Q 10/063 705/50 |
| 2013/0282641 A1 * | 10/2013 | Martin | G06N 5/02 706/47 |
| 2014/0012856 A1 * | 1/2014 | Abdelrahman | G06Q 30/0621 707/740 |

(Continued)

FOREIGN PATENT DOCUMENTS

| | | | |
|---|---|---|---|
| CA | 2911773 A1 * | 7/2016 | G06Q 10/06 |
| CN | 104899718 | 9/2015 | |

(Continued)

OTHER PUBLICATIONS

Gregory Braun, "The Internet of Things and the Modern Supply Chain", *C3 Solutions*, pp. 1-13.

*Primary Examiner* — Ashford S Hayles
(74) *Attorney, Agent, or Firm* — Finnegan, Henderson, Farabow, Garrett & Dunner, LLP

(57) ABSTRACT

In one embodiment, a method for orchestration of supply chain processes is disclosed. The method includes obtaining, by an orchestration system, Internet of Things (IOT) sensor data from IOT sensors, wherein the IOT sensors monitor a plurality of supply chain processes. The method includes determining, by the orchestration system, a process event corresponding to a supply chain process of the plurality of supply chain processes by analyzing the IOT sensor data and process impact data. Further, the method includes identifying, by the orchestration system, one or more process orchestrators for the process event based on a predictive model and executing, by the orchestration system, one or more workflows for each of the one or more process orchestrators based on pre-defined rules.

17 Claims, 5 Drawing Sheets

(56) References Cited

U.S. PATENT DOCUMENTS

| | | | |
|---|---|---|---|
| 2014/0095246 A1 | 4/2014 | Natarajan et al. | |
| 2016/0019563 A1* | 1/2016 | Jha | G06Q 10/087 705/7.31 |
| 2016/0094421 A1* | 3/2016 | Bali | H04L 43/04 709/223 |
| 2016/0162838 A1* | 6/2016 | Torkian | G06Q 10/107 709/206 |
| 2016/0196527 A1* | 7/2016 | Bose | G06Q 10/0832 705/332 |
| 2016/0217399 A1* | 7/2016 | Roelofs | G06Q 10/0635 |
| 2016/0334767 A1* | 11/2016 | Mummigatti | G05B 19/042 |
| 2016/0379165 A1* | 12/2016 | Moakley | H04W 4/046 705/333 |
| 2017/0006135 A1* | 1/2017 | Siebel | H04L 67/02 |
| 2017/0006141 A1* | 1/2017 | Bhadra | H04W 4/70 |
| 2017/0017909 A1* | 1/2017 | Srinivasan | G06Q 10/087 |
| 2017/0060911 A1* | 3/2017 | Loscalzo | G06F 16/258 |
| 2017/0083386 A1* | 3/2017 | Wing | G06F 9/542 |
| 2017/0083396 A1* | 3/2017 | Bishop | G06F 11/14 |
| 2017/0102978 A1* | 4/2017 | Pallath | G06F 11/0709 |
| 2017/0105131 A1* | 4/2017 | Song | H04W 4/70 |
| 2017/0116572 A1* | 4/2017 | Natarajan | G06K 7/10009 |
| 2017/0124633 A1* | 5/2017 | Natarajan | G06Q 30/0635 |
| 2017/0142023 A1* | 5/2017 | Yadav | H04L 47/70 |
| 2017/0176958 A1* | 6/2017 | Binotto | G05B 13/041 |
| 2017/0177322 A1* | 6/2017 | Clark | G06F 8/65 |
| 2017/0192628 A1* | 7/2017 | O'Connor | G05B 19/41885 |
| 2017/0228253 A1* | 8/2017 | Layman | G06F 9/485 |
| 2017/0256173 A1* | 9/2017 | Burford | G09B 5/125 |
| 2017/0322120 A1* | 11/2017 | Wang | G01M 99/008 |
| 2017/0336775 A1* | 11/2017 | Tokorozuki | G05B 19/406 |
| 2018/0013831 A1* | 1/2018 | Dey | H04L 67/12 |
| 2018/0060829 A1* | 3/2018 | Gillen | G06Q 10/1097 |
| 2018/0081972 A1* | 3/2018 | Mohanbabu | H04L 63/0876 |
| 2018/0084073 A1* | 3/2018 | Walsh | H04L 67/2819 |
| 2018/0096261 A1* | 4/2018 | Chu | G06N 7/005 |
| 2018/0097710 A1* | 4/2018 | Nochta | H04L 43/08 |
| 2018/0129694 A1* | 5/2018 | Hoffner | G06F 9/54 |
| 2018/0151044 A1* | 5/2018 | Puchta | G06Q 10/0833 |
| 2018/0174248 A1* | 6/2018 | Karra | G06Q 50/04 |
| 2018/0247515 A1* | 8/2018 | Brady | G08B 25/10 |
| 2018/0285796 A1* | 10/2018 | Kovacevic | G06Q 10/0635 |
| 2018/0299849 A1* | 10/2018 | Martin | G05B 19/0426 |

FOREIGN PATENT DOCUMENTS

| | | | | |
|---|---|---|---|---|
| WO | WO 2016/013925 | | 1/2016 | |
| WO | WO-2016186448 A1 * | 11/2016 | | G06Q 10/08 |
| WO | WO-2017047842 A1 * | 3/2017 | | G06Q 10/08 |
| WO | WO-2018009159 A1 * | 1/2018 | | H04L 29/08 |

\* cited by examiner

METHODS AND SYSTEMS FOR ORCHESTRATION OF SUPPLY CHAIN PROCESSES USING INTERNET OF TECHNOLOGY SENSOR'S EVENTS

TECHNICAL FIELD

This disclosure relates generally to supply chain processes, and more particularly to methods and systems for orchestration of supply chain processes using Internet of Technology (IOT) sensor events.

BACKGROUND

Currently, supply chain lifecycle includes combination of supply chain processes which are executed in parallel. These individual supply chain processes are executed in silo and don't interact with each other. As the interaction and information flow between the supply chain processes is less, a structured co-ordination of entire supply chain lifecycle is not possible. Further, the existing co-ordination between functional teams for each supply chain process is limited and unstructured. Besides unstructured coordination across business teams, there is lack of end to end supply chain impact analysis and limited proactive assessment and visibility of key performance indicators (KPIs).

Moreover, there is no way to find specific KPIs which are impacted due to limited and unstructured co-ordination between team and business. As proactive assessment of affected KPIs is not available for analysis, there is inbuilt delay in providing response due to dependency on previous knowledge of businesses & processes and communicating this knowledge across the global footprint.

SUMMARY

In one embodiment, a method for orchestration of supply chain processes is disclosed. The method includes obtaining, by an orchestration system, Internet of Things (IOT) sensor data from IOT sensors, wherein the IOT sensors monitor a plurality of supply chain processes. The method includes determining, by the orchestration system, a process event corresponding to a supply chain process of the plurality of supply chain processes by analyzing the IOT sensor data and process impact data. Further, the method includes identifying, by the orchestration system, one or more process orchestrators for the process event based on a predictive model and executing, by the orchestration system, one or more workflows for each of the one or more process orchestrators based on pre-defined rules.

In one embodiment, an orchestration system for orchestration of supply chain processes is disclosed. The orchestration system includes a processor and a memory communicatively coupled to the processor. The memory stores processor instructions, which, on execution, causes the processor to obtain Internet of Things (IOT) sensor data from IOT sensors, wherein the IOT sensors monitor a plurality of supply chain processes. The instructions further cause the processor to determine a process event corresponding to a supply chain process of the plurality of supply chain processes by analyzing the IOT sensor data and process impact data and identify one or more process orchestrators for the process event based on a predictive model. Further, the instructions cause the processor to execute one or more workflows for each of the one or more process orchestrators based on pre-defined rules.

In one embodiment, a non-transitory computer readable medium is disclosed. The non-transitory computer readable medium includes instructions stored thereon that when processed by at least one processor cause a device to perform operations including obtaining Internet of Things (IOT) sensor data from IOT sensors, wherein the IOT sensors monitor a plurality of supply chain processes. Further, the operations include determining a process event corresponding to a supply chain process of the plurality of supply chain processes by analyzing the IOT sensor data and process impact data and identifying one or more process orchestrators for the process event based on a predictive model. The operations include executing one or more workflows for each of the one or more process orchestrators based on pre-defined rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for orchestration of supply chain processes using Internet of Technology (IOT) Sensor events. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for orchestration of supply chain processes is described in conjunction with FIGS. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
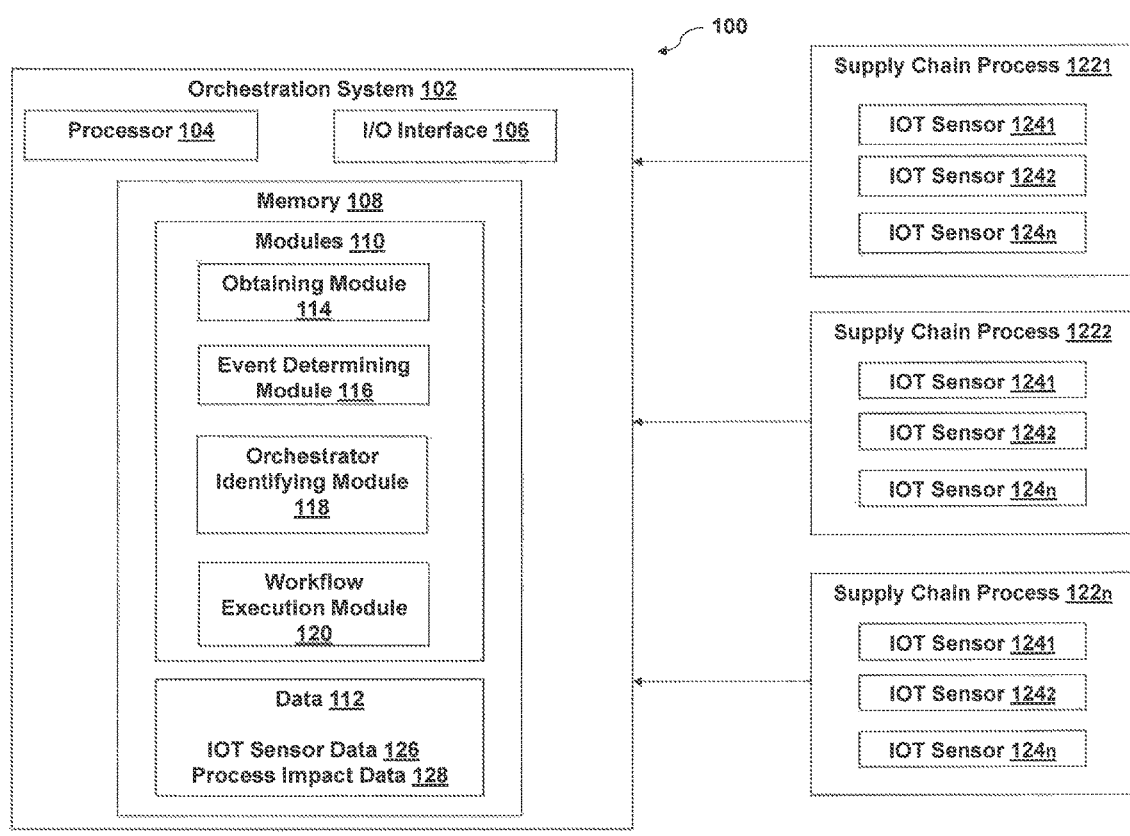
FIG. 1 illustrates an exemplary network implementation comprising an orchestration system for orchestration of supply chain processes, according to some embodiments of the present disclosure.

FIG. 1 illustrates an exemplary network implementation 100 comprising an orchestration system 102 for orchestration of supply chain processes using Internet of Technology (IOT) sensor events according to some embodiments of the present disclosure. As shown in the FIG. 1, the orchestration system 102 is communicatively coupled to a plurality of IOT sensors $124_1$, $124_2$, ... $124_n$. Hereinafter, the plurality of IOT sensors may be referred as plurality of IOT sensors 124 or IOT sensors 124. The IOT sensors 124 may be installed in a plurality of supply chain processes $122_1$, $122_2$, ... $122_n$. The IOT sensors 124 may monitor the plurality of supply chain processes 122.

The orchestration system 102 may be communicatively coupled to the IOT sensors 124 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the orchestration system 102 comprises a processor 104, a memory 108 coupled to the processor 104, and input/output (I/O) interface(s) 106. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor 104 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The I/O interface(s) 106 may include a variety of software and hardware interfaces, for example, a web interface, a graphical user interface, etc., allowing the orchestration system 102 to interact with the IOT sensors 124. Further, the I/O interface(s) 106 may enable the orchestration system 102 to communicate with other computing devices. The I/O interface(s) 106 can facilitate multiple communications within a wide variety of networks and protocol types, including wired networks, for example LAN, cable, etc., and wireless networks such as WLAN, cellular, or satellite. The I/O interface(s) 106 may include one or more ports for connecting a number of devices to each other or to another server.

In one implementation, the memory 108 includes modules 110 and data 112. In one example, the modules 110, amongst other things, include routines, programs, objects, components, and data structures, which perform particular tasks or implement particular abstract data types. The modules 110 may also be implemented as, signal processor(s), state machine(s), logic circuitries, and/or any other device or component that manipulate signals based on operational instructions. Further, the modules 110 can be implemented by one or more hardware components, by computer-readable instructions executed by a processing unit, or by a combination thereof.

In one implementation, the data 112 serves, amongst other things, as a repository for storing data fetched, processed, received and generated by one or more of the modules 110. In one embodiment, the data 112 may be stored in the memory 108 in the form of various data structures. Additionally, the aforementioned data can be organized using data models, such as relational or hierarchical data models. In an example, the data 112 may also comprise other data used to store data, including temporary data and temporary files, generated by the modules 110 for performing the various functions of the orchestration system 102.

In one implementation, the modules 110 further include an obtaining module 114, an event determining module 116, an orchestrator identifying module 118, and a workflow execution module 120. In an example, the modules 110 may also comprise other modules. The other modules may perform various miscellaneous functionalities of the orchestration system 102. It will be appreciated that such aforementioned modules may be represented as a single module or a combination of different modules.

In order to orchestrate supply chain processes using IOT sensor events, the obtaining module 114 may obtain IOT sensor data from the IOT sensors 124. The IOT sensors 124 may monitor the plurality of supply chain processes 122. The IOT sensors 124 may include, but is not limited to, a temperature sensor, a camera, and a speed sensor. In an example, a supply chain process 122 may be a product manufacturing process. The IOT sensor 124 monitoring the product manufacturing process may include one or more cameras installed near a conveyor belt conveying the manufactured product. The one or more cameras may capture images (IOT sensor data) of the manufactured product. The images of the manufactured product may be obtained by the obtaining module 114 for further analysis.

Upon obtaining the IOT sensor data, the event determining module 116 may determine a process event corresponding to a supply chain process 122 of the plurality of supply chain processes 122. The process event may include, but is not limited to, a quality process event, a fulfillment process event, a shipment process event, an inventory process event, or a supply process event.

The event determining module 116 may determine the process event by analyzing the IOT sensor data and process impact data. The process impact data may include real time impact data and historical impact data. The process impact data may be data which is not obtained from the IOT sensors 124 but has an impact on the supply chain process 122. In an example, the real time impact data may include, but is not limited to, current weather data, current geographical data, and IOT sensor data obtained from other supply chain processes 122. The historical impact data may include, but is not limited to, social media data and IOT sensor data obtained from IOT sensors 124 monitoring other supply chain processes 122. In an example, if the supply chain process 122 is the product manufacturing process, then the IOT sensor data obtained from other supply chain processes may impact the product manufacturing process. For example, a quality verification process, a product inventory management process, and a product shipment process may impact the product manufacturing process. Therefore, the IOT sensor data such as number of products shipped, the number of products present in an inventory may be used for determining the process event.

Referring again to the example of product manufacturing process, the IOT sensor data including the images of the manufactured product may be analyzed to identify the process event. The images of the manufactured product may be compared with reference images to identify any deviation in expected product dimensions. If the comparison of the images with the reference images exhibits a deviation, the quality process event may be determined.

Upon determining the process event, the orchestrator identifying module 118 may identify one or more process orchestrators for the process event based on a predictive model. The one or more process orchestrators may include, but is not limited to, a supply process orchestrator, a quality process orchestrator, a fulfillment process orchestrator, a shipment process orchestrator, an inventory process orchestrator, and a backlog process orchestrator. In an example, if the process event is the quality process event, the orchestrator identifying module 118 may predict one or more process orchestrators to orchestrate the product manufacturing process. The one or more process orchestrators may be predicted by performing predictive analytics using data associated with the supply chain process 122.

In one example, it may be considered that the process event identified is the quality process event. The orchestrator identifying module 118 may perform predictive analytics on process impact data associated with the supply chain process of product manufacturing. The predictive analytics on the process impact data may determine that the quality process event may also impact a product shipment process and a product supply process. For example, if the product dimension of the manufactured product is lesser than expected product dimension, then the product shipment process and the product supply process may be delayed. Therefore, the process orchestrator related to the product shipment process i.e. the shipment process orchestrator and the process orchestrator related to the product supply process i.e. supply process orchestrator may be identified for the quality process event.

Upon identifying the one or more process orchestrators, the workflow execution module 120 may execute one or more workflows for each of the one or more process orchestrators based on pre-defined rules. In an embodiment, executing of the one or more workflows may include performing one or more corrective actions related to occurrence of the process event. The one or more corrective actions may be extracted from a pre-defined database. The one or more corrective actions may comprise transmitting a notification to one or more stakeholders affected by the process event. For example, if the process event is the quality process event, then the one or more process orchestrators identified for the quality process event may be the quality process event, the supply process event, and the shipment process event. In order to orchestrate the supply chain process 122, the workflow execution module 120 may execute separate workflows for each of the process orchestrator. The execution of the one or more workflows for the process orchestrators is explained in detail in conjunction with the FIG. 2.

Figure 2:
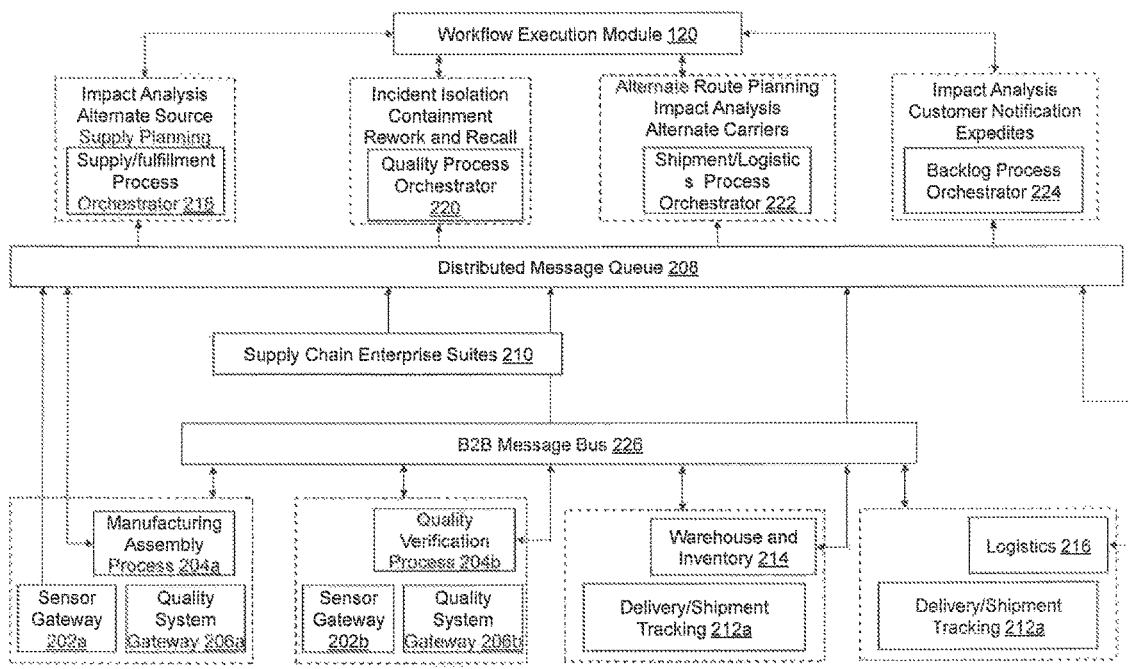
FIG. 2 illustrates an exemplary orchestration system for orchestration of supply chain processes in accordance with some embodiments of the present disclosure.

FIG. 2 illustrates an exemplary orchestration system for orchestration of supply chain processes in accordance with some embodiments of the present disclosure. As shown in the FIG. 2, a sensor gateway 202a and a sensor gateway 202b may obtain the IOT sensor data from the IOT sensors 124 installed in various supply chain processes. The supply chain processes may be a manufacturing assembly process 204a and a quality verification process 204b. The IOT sensor data obtained by the IOT sensor gateways 202 may be transferred to a distributed message queue 208. Additionally, the IOT sensor data may be transferred to other entities through the Business to Business (B2B) message bus 226. The distributed message queue 208 may also obtain process impact data from different data sources and supply chain enterprise suites 210. The supply chain enterprise suites 210 may include data corresponding to a collection of supply chain planning process, logistics and transportation management process, order management process, asset lifecycle management process, product life cycle management process, and the like. Thus, the data from the supply chain enterprise suites 210, the manufacturing assembly process 204a and the quality verification process 204b, the process impact data is integrated or available at a common data platform.

Additionally, the distributed message queue 208 also receives data from the IOT sensors 124 installed in a warehouse and inventory 214 for monitoring delivery or shipment tracking 212a. Similarly, the distributed message queue 208 also receives data from IOT sensors monitoring the delivery or shipment tracking 212a for enabling logistics 216.

The data available or integrated at the distributed message queue 208 is further analyzed to determine the process event. The process event may be determined by the event determining module 116. Upon determining the process event, relevant process orchestrators may be identified. The process orchestrators may be identified by the orchestrator identifying module 118. The process orchestrators may be supply/fulfillment process orchestrator, quality process orchestrator, shipment/logistics process orchestrator, and backlog process orchestrator.

In one embodiment, if the supply chain process is the product manufacturing process, and the process event is determined as the quality process event, then the process orchestrator identified may include the quality process orchestrator, the supply/fulfillment process orchestrator, and the shipment/logistics process orchestrator. For the quality process orchestrator, the workflow execution module 120 may execute workflows based on pre-defined rules. In an example, a workflow for halting manufacturing of the product for a pre-defined time may be executed. The manufactured products exhibiting deviation may be isolated and contained. Further, the stakeholders may be notified to rework the manufactured product or recall the manufactured product based on a degree of the deviation.

Further, if the process orchestrator is identified as the supply/fulfillment process orchestrator then the workflow execution module 120 may execute a workflow for impact analysis. The impact of deviation in quality of the manufactured product may be determined by performing a root cause analysis. In one embodiment, upon determining the impact, the workflow execution module 120 may execute a workflow for alternate source supply planning. The workflow for alternate source supply planning may be executed based on the pre-defined rules. For example, if the manufactured product is exhibiting deviation in product dimensions, then the manufactured product may be recalled. As the manufactured product is recalled, the pre-defined rules may suggest planning for an alternate source for supplying product. Therefore, a pre-defined workflow for alternate source supply planning may be executed to supply the product. In one example, the workflow for alternate source supply planning may include obtaining the products from a different manufacturer. Thus, the workflow execution module 120 may automatically contact another manufacturer for obtaining the product.

Additionally, if the process orchestrator is identified as the shipment/logistics process orchestrator, the workflow execution module 120 may execute workflows for impact analysis, alternate route planning, and alternate route carriers.

In one embodiment, if the process event is determined as a shipment quality event, the orchestrator identifying module 118 may identify the shipment/logistics process orchestrator and backlog process orchestrator for orchestrating the product manufacturing process 122. After identifying the one or more process orchestrators, the workflow execution module 120 may execute separate workflows for each process orchestrator. In an example, the workflow execution module 120 may execute the workflows for alternate route planning, impact analysis, and alternate carriers corresponding to the shipment/logistics process orchestrator. Moreover, if the process orchestrator is identified as the backlog process orchestrator, the workflow execution module 120 may execute workflows for impact analysis, customer notification, and expedites.

Thus, for orchestrating a supply chain process, one or more process orchestrators may be identified for each process event. Execution of workflows corresponding to each process orchestrator ensures integration and orchestration of entire supply chain lifecycle.

Figure 3:
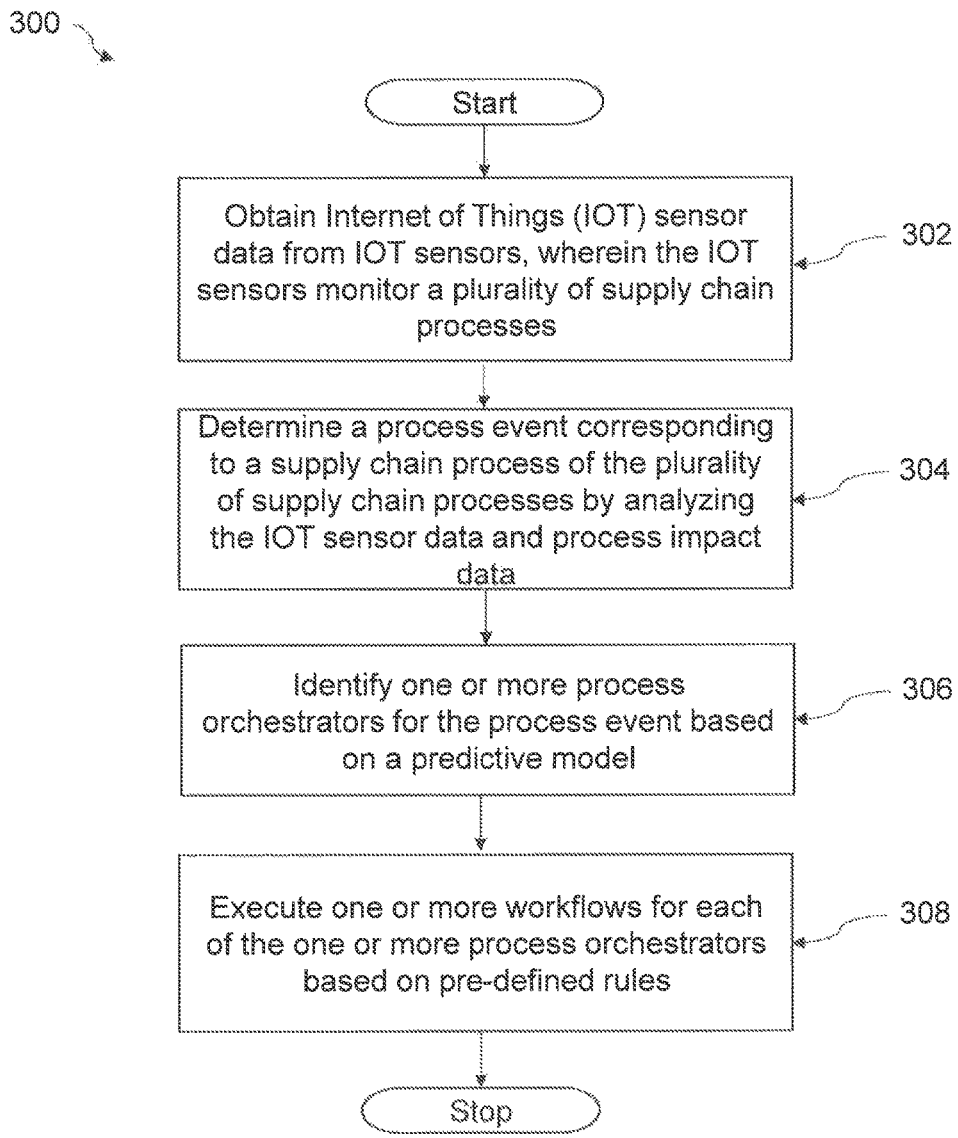
FIG. 3 is a flow diagram illustrating a method for orchestration of supply chain processes in accordance with some embodiments of the present disclosure.

FIG. 3 is a flow diagram illustrating a method 300 for orchestration of supply chain processes, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302 IOT sensor data may be obtained from IOT sensors 124. The IOT sensors may monitor a plurality of supply chain processes 122. The IOT sensors 124 may include, but is not limited to, a temperature sensor, a camera, and a speed sensor. In an example, the supply chain process 122 may be a product manufacturing process. The IOT sensor 124 monitoring the product manufacturing process may be one or more cameras installed near a conveyor belt conveying the manufactured product. The one or more cameras may capture images (IOT sensor data) of the manufactured product. The images of the manufactured product may be transmitted to the obtaining module 114 for further analysis. Obtaining the IOT sensor data from the IOT sensors 124 is explained in detail in conjunction with the FIG. 1.

At block 304, a process event corresponding to a supply chain process of the plurality of supply chain processes may be determined by analyzing the IOT sensor data and the process impact data. The process event may include, but is not limited to, a quality process event, a fulfillment process event, a shipment process event, an inventory process event, a supply process event. The process impact data may include real time impact data and historical impact data. The process impact data may be data which is not obtained from the IOT sensors 124 but has an impact on the supply chain process 122. The determining of the process event is explained in detail in conjunction with the FIG. 1

At block 306, one or more process orchestrators may be identified for the process event based on a predictive model. The one or more process orchestrators may include a supply process orchestrator, a quality process orchestrator, a fulfillment process orchestrator, a shipment process orchestrator, and an inventory process orchestrator. In an example, if the process event is the quality process event, the orchestrator identifying module 118 may predict one or more process orchestrators to orchestrate the product manufacturing process. The identifying of the one or more process orchestrators is explained in detail in conjunction with the FIG. 1.

At block 308, one or more workflows may be executed for each of the one or more process orchestrators based on pre-defined rules. In an embodiment, executing of the one or more workflows may include performing one or more corrective actions related to occurrence of the process event. The one or more corrective actions may be extracted from a pre-defined database. The one or more corrective actions may comprise transmitting a notification to one or more stakeholders affected by the process event. For example, if the process event is the quality process event, then the one or more process orchestrators identified for the quality process event may be the quality process event, the supply process event, and the shipment process event. In order to orchestrate the supply chain process 122, the workflow execution module may execute separate workflows for each of the process orchestrator. The executing of the one or more workflows is explained in detail in conjunction with the FIG. 1.

Figure 4:
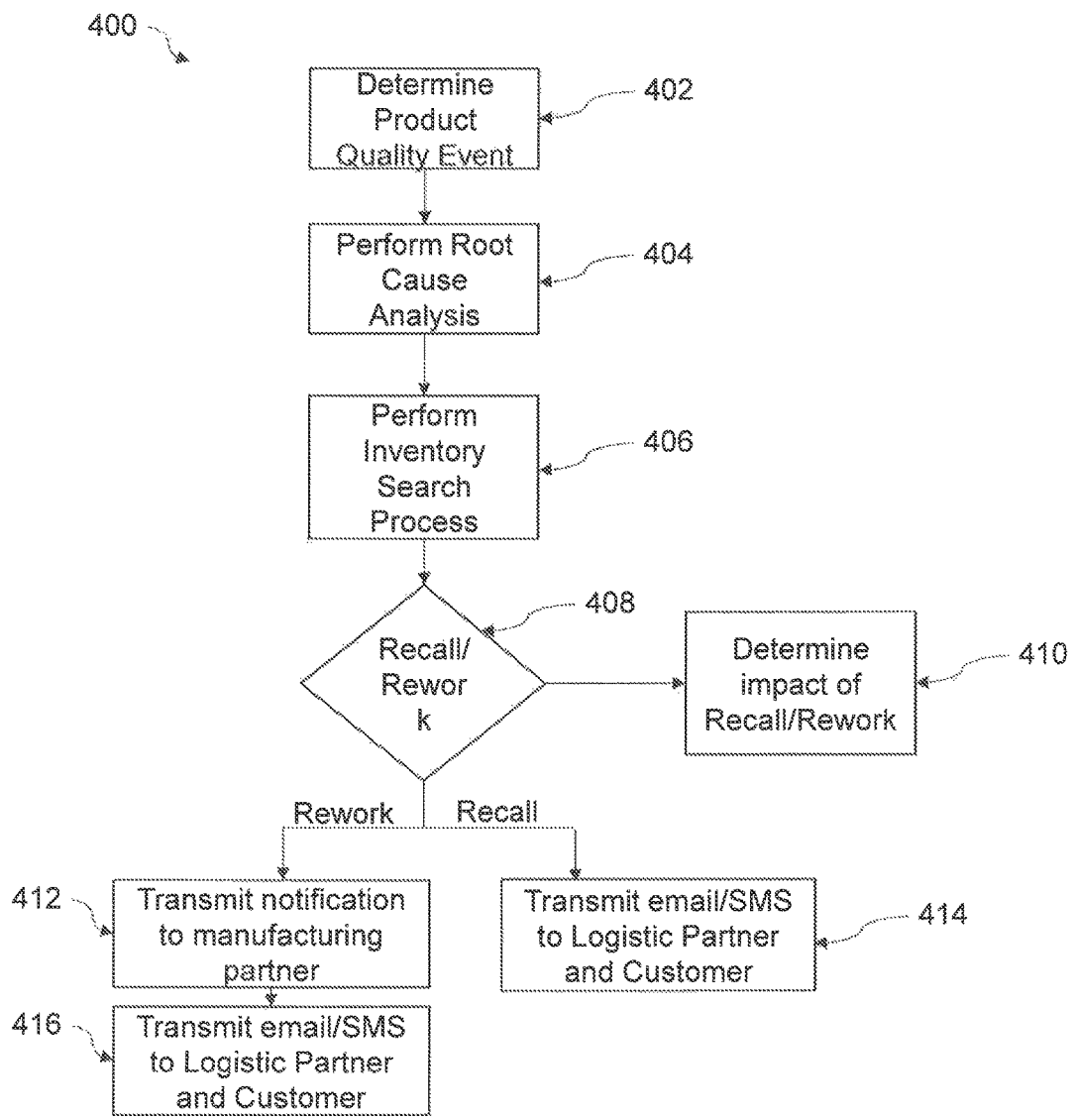
FIG. 4 is a flow diagram illustrating a method for orchestration of supply chain process for a quality orchestrator in accordance with some embodiments of the present disclosure.

FIG. 4 is a flow diagram illustrating a method for orchestration of supply chain process for a quality orchestrator in accordance with some embodiments of the present disclosure.

The method 400 may be described in the general context of computer executable instructions. Generally, computer executable instructions can include routines, programs, objects, components, data structures, procedures, modules, and functions, which perform particular functions or implement particular abstract data types. The method 400 may also be practiced in a distributed computing environment where functions are performed by remote processing devices that are linked through a communication network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternative methods. Additionally, individual blocks may be deleted from the method 300 without departing from the spirit and scope of the subject matter described herein. Furthermore, the method 400 can be implemented in any suitable hardware, software, firmware, or combination thereof.

With reference to the FIG. 4, at block 402, a product quality event may be determined. The product quality event may be determined for a product manufacturing process. The product quality event may be determined by analyzing IOT sensor data obtained from the IOT sensors 122 installed to monitor the product manufacturing process. In an example, the IOT sensors including cameras may monitor the product manufacturing process. The images captured by the cameras may be analyzed by the event determining module 116 to determine the product quality event. The determining of the product quality event or the quality process event is explained in detail in conjunction with the FIG. 1.

At block 404, a root cause analysis may be performed to identify a root cause for the quality process event or the product quality event. The root cause analysis may be performed by the orchestration system 102 by analyzing the IOT sensor data, the process impact data, and reference data. The reference data may include data corresponding to similar process events, or data corresponding to workflows executed or pre-defined in the orchestration system 102 for historical process events.

At block 406, an inventory search process may be performed upon identifying the root cause for the product quality event. The inventory search process may include searching a product inventory to identify similar products. Further, the similar products may be categorized as ready to ship products, delivered products, and ready to deliver products. The number of products in each category may be counted to identify a deficiency in expected number of products to be delivered. Additionally, the manufactured products with deficiency may be compared with the delivered products to identify a degree in deviation.

At block 408, the manufactured product may be recalled or reworked based on the degree in deviation. The manufactured product may be recalled or reworked based on pre-defined rules. For example, if the degree in deviation is less than a threshold value, then the manufactured product may be reworked. On the other hand, if the degree in deviation is more than the threshold value, then the manufactured product may be recalled.

At block 410, impact of recall or rework may be computed. The impact of recall or rework on the manufactured product may be computed by analyzing time consumed for producing the product, cost of rework, and time consumed for delivery or shipment of the product.

At block 412, a notification may be transmitted to a manufacturing partner if the manufactured product is being reworked. In an example, the notification may be an email or a Short Message Service (SMS).

At block 414, a notification may be transmitted to a logistic partner and a customer if the manufactured product is being reworked. In an example, the notification may be an email or a SMS.

At block 416, a notification may be transmitted to a logistic partner and a customer if the manufactured product is recalled. In an example, the notification may be an email or a SMS.

Computer System

Figure 5:
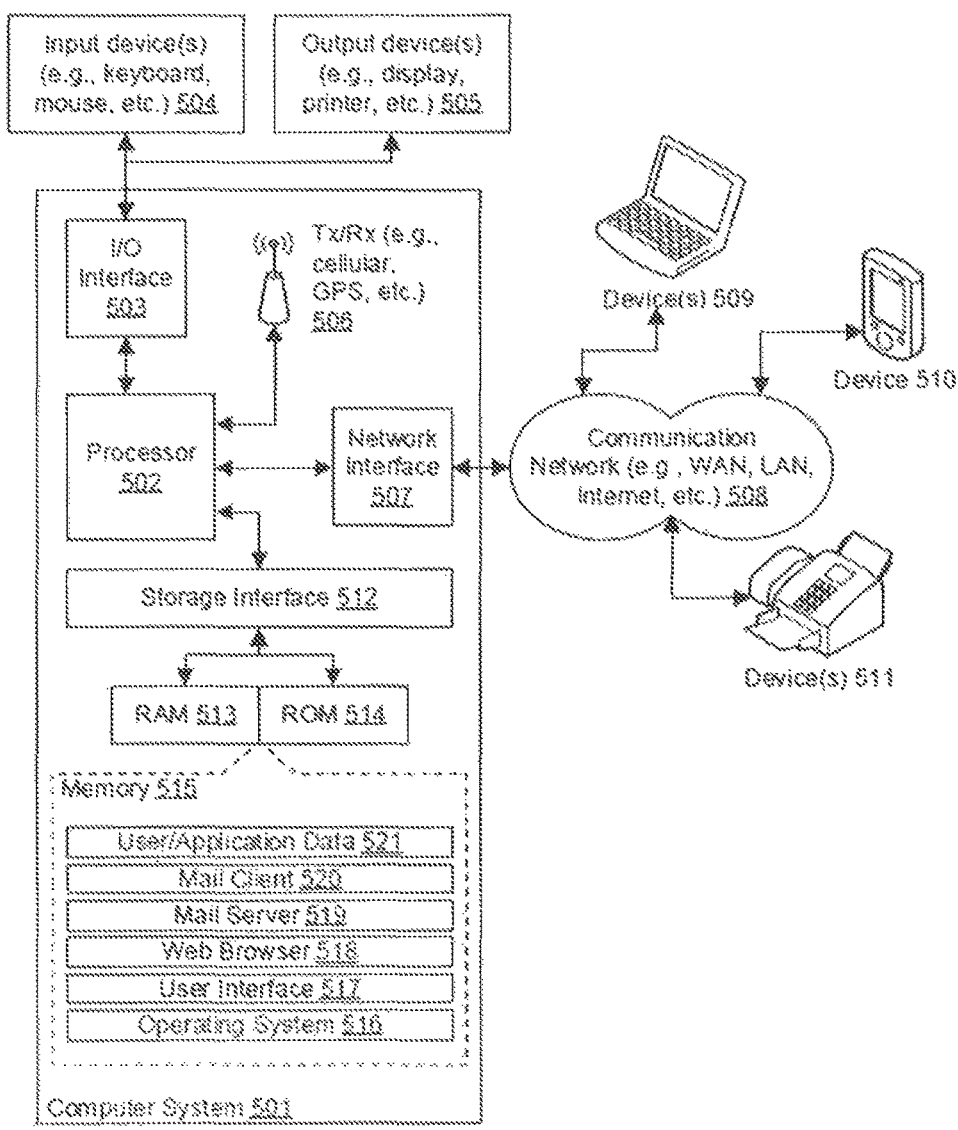
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the obtaining module 114, the event determining module 116, the orchestrator identifying module 118, and the workflow execution module 120. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for orchestration of supply chain processes using IOT sensor events. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for orchestration of supply chain processes, the method comprising:
    obtaining, by an orchestration system, Internet of Things (IOT) sensor data from IOT sensors, wherein the IOT sensors monitor a plurality of supply chain processes;
    determining, by the orchestration system, a process event corresponding to a supply chain process of the plurality of supply chain processes by analyzing the IOT sensor data and process impact data;
    identifying, by the orchestration system, one or more process orchestrators that are impacted by the process event based on a predictive model, wherein the one or more process orchestrators comprises a supply process orchestrator, a quality process orchestrator, a fulfillment process orchestrator, a shipment process orchestrator, and an inventory process orchestrator; and
    executing, by the orchestration system, one or more workflows for each of the one or more process orchestrators that are impacted by the process event based on pre-defined rules, wherein the executing of the one or more workflows comprises performing one or more corrective actions related to occurrence of the process event.

2. The method of claim 1, wherein the process impact data comprises real time impact data and historical impact data.

3. The method of claim 1, wherein the process event comprises a quality process event, a fulfillment process event, a shipment process event, an inventory process event, a supply process event.

4. The method of claim 1, further comprising performing, by the orchestration system, root cause analysis to identify a root cause associated with the process event.

5. The method of claim 1, wherein the one or more corrective actions are extracted from a pre-defined database.

6. The method of claim 5, wherein the performing of the one or more corrective actions comprises transmitting a notification to one or more stakeholders affected by the process event.

7. An orchestration system for orchestration of supply chain processes, the orchestration system comprising:
    a processor; and
    a memory communicatively coupled to the processor, wherein the memory stores processor instructions, which, on execution, causes the processor to:
    obtain Internet of Things (IOT) sensor data from IOT sensors, wherein the IOT sensors monitor a plurality of supply chain processes;
    determine a process event corresponding to a supply chain process of the plurality of supply chain processes by analyzing the IOT sensor data and process impact data;
    identify one or more process orchestrators that are impacted by the process event based on a predictive model, wherein the one or more process orchestrators comprises a supply process orchestrator, a quality process orchestrator, a fulfillment process orchestrator, a shipment process orchestrator, and an inventory process orchestrator; and
    execute one or more workflows for each of the one or more process orchestrators that are impacted by the process event based on pre-defined rules, wherein the executing of the one or more workflows comprises performing one or more corrective actions related to occurrence of the process event.

8. The orchestration system of claim 7, wherein the process impact data comprises real time impact data and historical impact data.

9. The orchestration system of claim 7, wherein the process event comprises a quality process event, a fulfillment process event, a shipment process event, an inventory process event, a supply process event.

10. The orchestration system of claim 7, wherein the processor is further caused to perform root cause analysis to identify a root cause associated with the process event.

11. The orchestration system of claim 7, wherein the one or more corrective actions are extracted from a pre-defined database.

12. The orchestration system of claim 11, wherein the one or more corrective actions comprises transmitting a notification to one or more stakeholders affected by the process event.

13. A non-transitory computer readable medium including instructions stored thereon that when processed by at least one processor cause a device to perform operations comprising:
    obtaining Internet of Things (IOT) sensor data from IOT sensors, wherein the IOT sensors monitor a plurality of supply chain processes;
    determining a process event corresponding to a supply chain process of the plurality of supply chain processes by analyzing the IOT sensor data and process impact data;
    identifying one or more process orchestrators that are impacted by the process event based on a predictive model, wherein the one or more process orchestrators comprises a supply process orchestrator, a quality process orchestrator, a fulfillment process orchestrator, a shipment process orchestrator, and an inventory process orchestrator; and
    executing one or more workflows for each of the one or more process orchestrators that are impacted by the process event based on pre-defined rules, wherein the executing of the one or more workflows comprises performing one or more corrective actions related to occurrence of the process event.

14. The non-transitory computer readable medium of claim 13, wherein the process impact data comprises real time impact data and historical impact data.

15. The non-transitory computer readable medium of claim 13, wherein the process event comprises a quality process event, a fulfillment process event, a shipment process event, an inventory process event, a supply process event.

16. The non-transitory computer readable medium of claim 13, wherein the operations further comprising performing root cause analysis to identify a root cause associated with the process event.

17. The non-transitory computer readable medium of claim 13, wherein the one or more corrective actions are extracted from a pre-defined database.

* * * * *